United States Patent
Fujita et al.

(10) Patent No.: US 7,651,807 B2
(45) Date of Patent: Jan. 26, 2010

(54) FUEL CELL SYSTEM

(75) Inventors: Goro Fujita, Ota (JP); Kenji Kibune, Kobe (JP); Shinichiro Imura, Gunma (JP); Hiroki Kabumoto, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 274 days.

(21) Appl. No.: 11/691,294

(22) Filed: Mar. 26, 2007

(65) Prior Publication Data

US 2007/0224472 A1    Sep. 27, 2007

(30) Foreign Application Priority Data

Mar. 27, 2006  (JP)  .............................. 2006-086721

(51) Int. Cl.
    *H01M 2/00*  (2006.01)
(52) U.S. Cl. .......................................... 429/34; 429/22
(58) Field of Classification Search .................. 429/12, 429/22, 34, 36, 38, 13
    See application file for complete search history.

(56) References Cited

U.S. PATENT DOCUMENTS

2006/0257707 A1*  11/2006  Kaschmitter et al. .......... 429/34
2007/0037023 A1*   2/2007  Dunn et al. .................... 429/15
2008/0171241 A1*   7/2008  Kaye et al. ..................... 429/17

FOREIGN PATENT DOCUMENTS

JP        2004-152741        5/2004

* cited by examiner

*Primary Examiner*—Patrick Ryan
*Assistant Examiner*—Monique Wills
(74) *Attorney, Agent, or Firm*—Ditthavong, Mori & Steiner, P.C.

(57) ABSTRACT

A fuel cell system includes a fuel cell, a fuel tank, a first passage which supplies liquid fuel from the fuel tank to the fuel cell, a cartridge holder in which a plurality of types of cartridges are replaceably loaded, a second passage which supplies the content discharged from the cartridge to the fuel cell, a cartridge detector which detects the type of cartridge loaded in the cartridge holder, and a passage control means which controls the passages in accordance with the type of cartridge detected.

4 Claims, 12 Drawing Sheets

FUEL CELL SYSTEM

BACKGROUND OF THE INVENTION

1. Field of the Invention

The present invention relates to a fuel cell system and, more particularly, to a technology for changing the passages in the fuel cell system in accordance with the type of cartridge loaded.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration.

Of various types of fuel cells, a polymer electrolyte fuel cell excels in its low operating temperature and high output density. Recently, direct methanol fuel cells (DMFC) are especially attracting the attention as a type of polymer electrolyte fuel cell. In a DMFC, methanol water solution as a fuel is not reformed and is directly supplied to the anode so that electricity is produced by an electrochemical reaction induced between the methanol water solution and oxygen. Discharged as reaction products resulting from the electrochemical reaction are carbon dioxide emitted from the anode and generated water emitted from the cathode. Methanol water solution has a higher energy density per unit volume than hydrogen. Moreover, it is suitable for storage and poses little danger of explosion. Accordingly, it is expected that methanol water solution will be used in power supplies for automobiles, mobile devices (cell phones, notebook personal computers, PDAs, MP3 players, digital cameras, electronic dictionaries and books) and the like.

Generally, methanol water solution used in a DMFC is supplied in the form of a detachable cartridge. A cartridge stores methanol water solution at higher concentration than the concentration optimal for power generation. The high concentration methanol is diluted in a diluted fuel tank in the fuel cell system before being supplied to a DMFC. This arrangement increases power generated per cartridge and improves the convenience of a DMFC (see, for example, patent document No. 1).

[patent document No. 1] JP 2004-152741

When a DMFC has just been purchased or when a DMFC is not scheduled to be used for a long period of time so that the diluted fuel tank is emptied for the purpose of storage, purified water needs to be supplied to the diluted fuel tank before using the DMFC. In this background, there are demands for a fuel cell system in which user maintenance such as supplying of purified water can be easily performed. Meanwhile, if user convenience is pursued too much and the structure of the fuel cell system becomes complicated as a result, it would be difficult to save space and cost.

SUMMARY OF THE INVENTION

A general purpose of the present invention is to provide a fuel cell system in which user maintenance of a DMFC is facilitated without increasing the complexity of structure of the fuel cell system.

A fuel cell system according to at least one embodiment of the present invention comprises: a fuel cell which generates power using liquid fuel and oxidant; a fuel tank which stores the liquid fuel; a first passage which supplies the liquid fuel from the fuel tank to the fuel cell; a cartridge holder in which a plurality of types of cartridges are replaceably loaded; a second passage which supplies the content discharged from the cartridge to the fuel cell; cartridge detecting means which detects the type of cartridge loaded in the cartridge holder; and passage control means which controls the passages in accordance with the type of cartridge detected.

According to this embodiment, users can easily perform maintenance of the fuel cell system merely by changing cartridges.

Preferably, when the cartridge detecting means detects that the cartridge loaded is a cartridge for storing liquid fuel to be supplied to the fuel tank, the passage control means switches the passages so that the liquid fuel discharged from the cartridge is supplied to the fuel tank, and also switches the passages so that effluent from the fuel cell is collected in the fuel tank.

Preferably still, when the cartridge detecting means detects that the cartridge loaded is a cartridge for storing cleaning liquid for cleaning the electrolyte membrane or the anode in the fuel cell, the passage control means switches the passages so that the content discharged from the cartridge is supplied to the fuel cell, and also switches the passages so that the effluent from the fuel cell is collected in the cartridge.

Preferably still, when the cartridge detecting means detects that the cartridge loaded includes first and second containers, the first container including, for supply to the fuel tank, purified water or liquid fuel diluted to a predetermined concentration, and the second container being for collecting effluent from the fuel cell, the passage control means controls the passages so that the content discharged from the cartridge is supplied to the fuel tank, and collects, in the second container, the liquid fuel in the fuel tank or inert gas in the fuel cell, by collecting the effluent from the fuel cell in the cartridge, and the passage control means further controls the passages so that the content discharged from the cartridge is supplied to the fuel cell, and supplies, to the fuel tank, the purified water or the liquid fuel diluted to the predetermined concentration stored in the first container, by collecting the effluent from the fuel cell in the fuel tank.

Preferably still, when the cartridge detecting means detects that the cartridge loaded includes first and second containers, the first container storing inert gas for preventing degradation of the fuel cell, and the second container being for collecting effluent from the fuel cell, the passage control means controls the passages so that the content discharged from the cartridge is supplied to the fuel tank, and collects, in the second container, the liquid fuel in the fuel tank, by collecting the effluent from the fuel cell in the cartridge, and the passage control means further controls the passages so that the content discharged from the cartridge is supplied to the fuel cell, and supplies, to the fuel tank, the inert gas stored in the first container, by collecting the effluent from the fuel cell in the fuel tank.

According to this embodiment, users can easily define a selection of passages in the fuel cell system optimal for the type of cartridge, merely by changing cartridges. As a result, users can easily perform maintenance of the fuel cell.

DETAILED DESCRIPTION OF THE INVENTION

The invention will now be described by reference to the preferred embodiments. This does not intend to limit the scope of the present invention, but to exemplify the invention.

Figure 1:
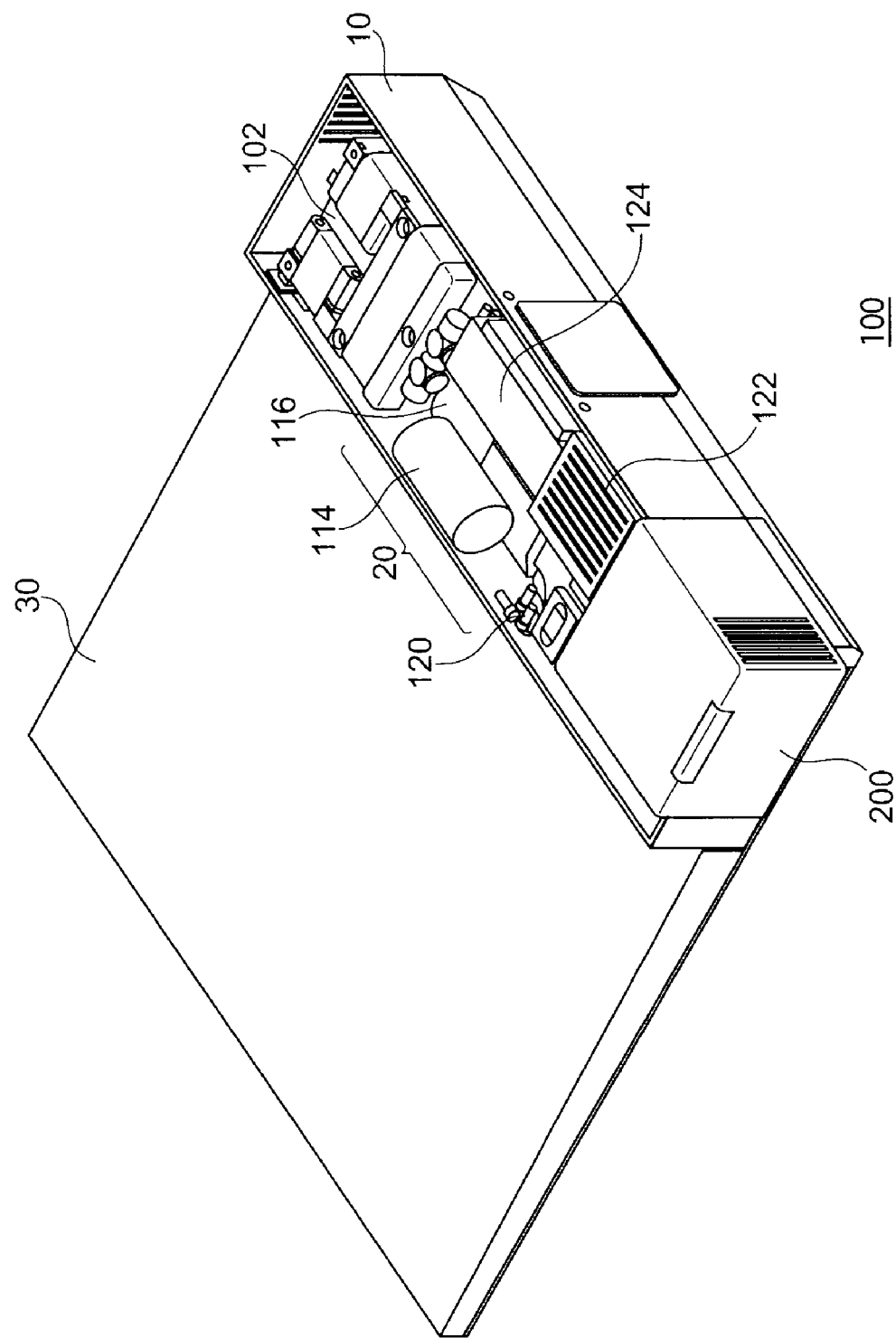
FIG. 1 is a perspective view of a fuel cell system according to an embodiment of the present invention.
Figure 2:
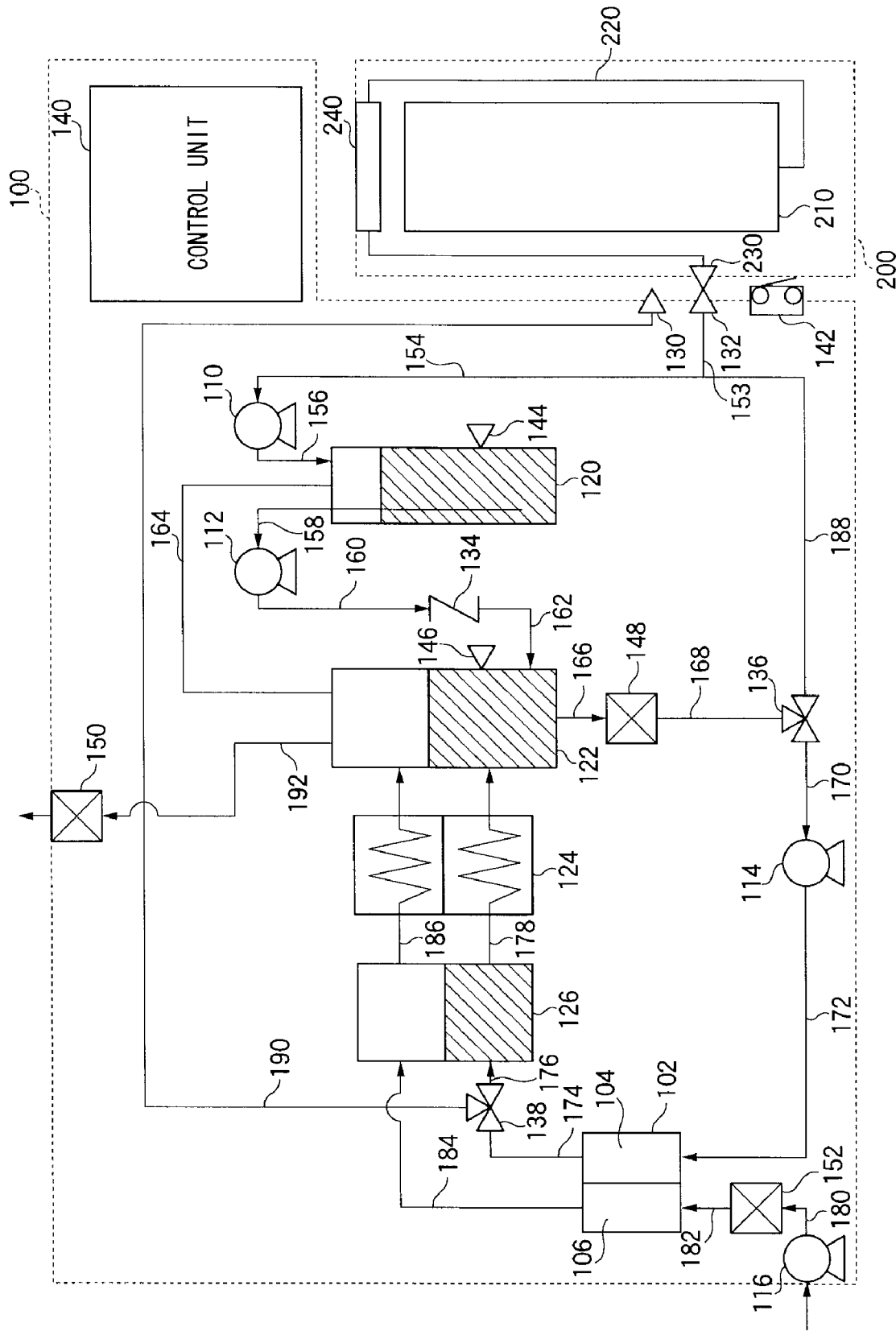
FIG. 2 illustrates the structure of the fuel cell system.

FIG. 1 is a perspective view of a fuel cell system 100 according to an embodiment of the present invention, and FIG. 2 illustrates the structure of the fuel cell system 100. The fuel cell system 100 uses methanol as a liquid fuel. This system 100 is a direct methanol fuel cell (DMFC) system which generates electric power in a fuel cell by an electrochemical reaction induced between the methanol and air as an oxidant. The system 100 is compact in overall size so that it can be suitably used as a power supply for a portable notebook personal computer.

The fuel cell system 100 is structured such that inside a casing 10 as shown in FIG. 1 is mounted a fuel cell 102 on one side thereof in a longitudinal direction. A fuel cartridge 200 connected detachably with the fuel cell system 100 is mounted on the other side. An auxiliary unit 20 is mounted approximately in the center. A control unit 140 and a secondary cell are provided within a cradle 30 on which a notebook personal computer is placed.

Referring to FIGS. 1 and 2, the fuel cartridge 200 mainly used in the fuel cell system 100 is loaded. Adjacent to the fuel cartridge 200 are provided a fuel sub-tank 120 and a diluted fuel tank 122. Pure methanol or high concentration methanol water solution stored in a fuel bag 210 within the fuel cartridge 200 is introduced into the diluted fuel tank 122 via the fuel sub-tank 120 and then diluted into a predetermined concentration of 1 mol/L. The fuel sub-tank 120 has the function of eliminating the air (gas components) mixed in fuel supply passages 220, 153, 154 and 156 at the time when the fuel cartridge 200 is mounted or removed. The diluted fuel tank 120 has not only the function of adjusting the concentration of fuel but also the function of a vapor-liquid separator whereby the gas components discharged from the fuel cell 102 are discharged outside the fuel cell system 100.

The auxiliary unit 20 includes a pump 110 which supplies fuel from the fuel bag 210 to the fuel sub-tank 120, a pump 112 which supplies fuel from the fuel sub-tank 120 to the diluted fuel tank 122 and a pump 114 which supplies fuel from the diluted fuel tank 122 to the fuel cell 102. This auxiliary unit 20 is mounted between the fuel cell 120 and a fuel storage comprising the fuel cartridge 200, the fuel sub-tank 120 and the diluted fuel tank 122. This results in the minimum length of the fuel supply passages 220, 153, 154, 156, 158, 160, 162, 166, 168, 170 and 172, saving space in the fuel cell system 100. The layout also enables the intermittently supplied high concentration methanol to be promptly supplied to the fuel cell 102.

The auxiliary unit 20 also includes a pump 116 for supplying oxygen to a cathode 106 side of the fuel cell 102. Air taken in by the pump 116 from the atmosphere is guided through an oxygen supply passage 180 and an air filter 152. This removes dust and the like in the atmosphere. The air passing through the air filter 152 is guided through the oxygen supply passage 182 before being supplied to the cathode 106 side.

The auxiliary unit 40 further includes a vapor-liquid separator 126 and a cooler 124. The vapor-liquid separator 126 and the cooler 124 are mounted between the fuel cell 102 and the diluted fuel tank 122. The vapor-liquid separator 126 mixes anode effluent (waste methanol+carbon dioxide) composed principally of the liquid discharged from an anode 104 side of the fuel cell 102 with cathode effluent (exhaust air+ generated water) composed principally of gas discharged from the cathode 106 side thereof, via a cathode side exhaust passage 184, an anode side exhaust passage 174 and an exhaust passage 176. The mixture is then separated into a gas component and a fluid component. The cooler 124 distributes the gas component and the fluid component separated by the vapor-liquid separator 126 through different pipings (186, 176) and cools the effluent of the fuel cell 102 by a cooling fan that discharges the air inside the fuel cell system 100. Thus, by providing the vapor-liquid separator 126 upstream of the diluted fuel tank 122 (cooler 124) having the function of vapor-liquid separation, the anode side effluent and the cathode-side effluent each containing a mixture of liquid and gas are mixed. The liquid component and the gas component are distributed to a liquid component passage 178 and a gas component passage 186, respectively, so as to be cooled. Thus, the heat exchange efficiency in the cooler 124 is improved as compared to when the fluid with the gas and the liquid mixed together is cooled.

A three-way valve 138 is provided in a communicating passage connecting the diluted fuel tank 122 to the fuel cell 102. A three-way valve 138 is provided in a communicating passage connecting the anode 104 side of the fuel cell 102 to the vapor-liquid separator 126. The fuel supply passage 153 branches into the fuel supply passage 154 and the supply passage 188 before reaching the fuel sub-tank 120. The supply passage 188 is connected to the three-way valve 136. The three-way valve 136 is adapted to connect the fuel supply passage 168 to the fuel supply passage 170 or connect the supply passage 188 to the fuel supply passage 170 by switching the valves. The three-way valve 136 is provided in a communicating passage connecting the pump 114 to the diluted fuel tank 122. By switching the valves in the three-way valve 136, the methanol water solution in the diluted fuel tank 122 can be supplied to the fuel cell 102, or the content in the cartridge can be supplied to the diluted fuel tank 122 via the fuel cell 102, the vapor-liquid separator 126 and the cooler 124. The three-way valve 138 is connected to the anode side exhaust passage 174. The three-way valve 138 causes the anode side exhaust passage 174 to branch into the exhaust passage 176 connected to the vapor-liquid separator 126 and into the exhaust passage 190 connected to a fuel cell system exhaust joint 130. The three-way valve 138 is adapted to connect the anode side exhaust passage 174 to the exhaust passage 176 or connect the anode side exhaust passage 174 to the exhaust passage 190 by switching the valves. The three-way valve 136 and the three-way valve 138 are electromagnetic valves controlled by an electric signal from the control unit 140.

The gas component of the effluent of the fuel cell 102 collected by the diluted fuel tank 122 is released outside the fuel cell system 100 through a gas component exhaust passage 192. The gas component exhaust passage 192 is preferably as long as possible so that the liquid component is not released outside. It is preferred that an exhaust filter 150 be provided at an exit of the gas component exhaust passage 192.

The amount of generated water produced by the fuel cell 102 is greater than the amount of water vapor discharged from the diluted fuel tank 122. Therefore, in view of the possibility that the fuel circulating within the fuel cell system 100 overflows from the diluted fuel tank 122, the diluted fuel tank 122 and the fuel sub-tank 120 are connected with each other through a piping (tank communicating passage 164) provided above them. When the diluted fuel tank 122 overflows, the fuel sub-tank 120 plays the role of a buffer for the diluted fuel tank 122. When the pressure in the fuel sub-tank 120 rises temporarily as the fuel is supplied from the fuel cartridge 200 to the fuel sub-tank 120, the diluted fuel tank 122 plays the role of allowing the pressure of the fuel sub-tank 120 to escape. A check valve 134 is provided between the fuel sub-tank 120 and the diluted fuel tank 122. The system is so structured that the diluted methanol water solution does not flow backward from the diluted fuel tank 122 to the fuel sub-tank 120, unless the diluted methanol water solution overflows via the tank communicating passage 164. That is, the diluted methanol water solution does not flow backward to the fuel supply sub-tank 120 via the fuel supply passage 162 and the fuel supply passages 160 and 158.

A liquid-level sensor 144 is provided in the fuel sub-tank 120, and a sensor 146 is provided in the diluted fuel tank 122. These sensors measure the liquid-level position and concentration of the water solution inside the tanks and transmit the data to the control unit 140. The control 140 supplies fuel from the fuel cartridge 200 to the fuel sub-tank 120 by referring to the data from the liquid-level sensor 144. The control unit 140 also controls various devices in the fuel cell system 100 by referring to the data from the sensor 146. For example, the control unit 140 detects reduction in concentration of the methanol water solution in the diluted fuel tank 122 so as to supply high concentration methanol from the fuel sub-tank 120 to the diluted fuel tank 122. A fuel filter 148 is provided in a communicating passage connecting the diluted fuel tank 122 to the three-way valve 136. The fuel filter 148 removes the impurities in the methanol water solution. The filtered methanol water solution is supplied to the fuel cell 102.

A cartridge outlet joint 230 and a fuel cell system intake joint 132 are provided in a communicating passage connecting the fuel bag 210 to the fuel sub-tank 120. The fuel passage 220 and the fuel passage 153 are connected via these joints. In order to provide the housing main body with a safety mechanism for collecting the leaked fuel, at the time of inserting or removing a cartridge, and a locking mechanism for locking the joints, the joints are such that the cartridge outlet joint 230 in the fuel cartridge 200 side is a male whereas the fuel cell system intake joint 132 in the fuel sub-tank 120 side is a female. In this manner, the female structure allows the assembly of more complicated mechanisms and realizes a simple structure in the fuel cartridge 200 side, thus achieving advantageous aspects in terms of the size and cost. The fuel cell system exhaust joint 130 is provided in a communicating passage connecting the three-way valve 138 to the fuel cartridge 200. The fuel cell system exhaust joint 130 is used to collect the effluent from the fuel cell system 100, when the cartridge includes two containers inside. The fuel cell system exhaust joint 130 and the cartridge joint used to collect the effluent are also male-female joints.

To detect the status of whether the fuel cartridge 200 is being inserted or removed, a cartridge detector 142 is provided in the housing main body of the fuel cell system 100 in contact with the fuel cartridge 200. The cartridge detector 142 is capable of detecting whether the fuel cartridge 200 is normally fitted into the fuel cell system 100 or not, so as to make sure that the fuel is not leaked from the cartridge outlet joint 230 and the fuel cell system intake joint 132 while the system is in use. The means for detecting whether the fuel cartridge 200 is attached or detached is not limited to the cartridge detector 142. The structure may be such that an IC chip or the like is embedded in a predetermined position of the fuel cartridge 200 so as to detect the position of the IC chip. Information on the fuel cartridge 200, such as volume, concentration, fuel type and serial number, may be stored in the IC chip and communicated between the chip and the control unit 140 of the fuel cell system 100.

The cartridge detector 142 detects the type of cartridge. The control unit 140 determines whether the cartridge detected is of a type required in the fuel cell system 100. When the cartridge loaded is of a type required in the fuel cell system 100, the control unit 140 controls the pump 114, the three-way valves 136 and 138 etc. to execute processes adapted for the cartridge. When the cartridge loaded is not of a type required in the fuel cell system 100, the control unit 140 notifies a user that the cartridge is not of a required type. For notification, audio output may be provided or display may be presented to the user for visual confirmation.

The fuel supply passage 220 of the fuel cartridge 200 has its inlet positioned in the bottom of the fuel bag 210, and is so arranged as to extend upward along the side of wall within the fuel cartridge 200 and is connected with the cartridge outlet joint 230. A fuel confirmation window 240 is set up in an upper part, namely part of upper hem, of the fuel cartridge 200 so that the fuel supply passage 220 is visible. It is desirable that a transparent material such as Teflon (registered trademark) tube be used to form the fuel supply passage 220 to confirm the interior of the fuel supply passage 220 from this fuel confirmation window 240. The fuel bag 210 is a variable-volume container, and a small amount of gas such as air is presealed inside together with the fuel. Hence, when there remains only a small amount of fuel stored in the fuel bag 210, the boundary between liquid phase and gaseous phase can be visibly verified. The confirmation will be further facilitated if the fuel is colored beforehand.

Figure 3:
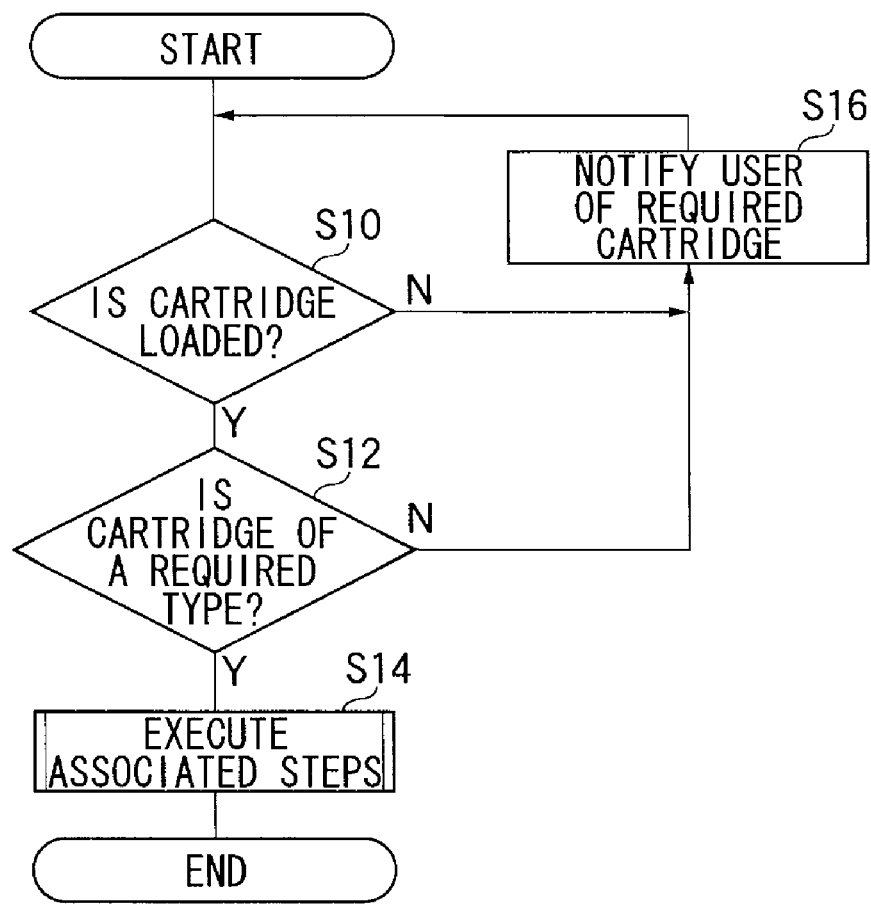
FIG. 3 is a flowchart of a process performed when the fuel cell system is started or when a cartridge is exchanged.

FIG. 3 is a flowchart of a process performed when the fuel cell system 100 is started or when a cartridge is exchanged. Initially, the cartridge detector 142 detects whether a cartridge is loaded in the fuel cell system 100 (S10). If it is determined that a cartridge is not loaded when the fuel cell system 100 is started (N in S10), the control unit 140 notifies the user of the type of cartridge required in the fuel cell system 100 (S16). The type of cartridge required varies depending on the situation. Therefore, the control unit 140 may make a determination by referring to a usage history recorded in a memory in the fuel cell system 100. If a cartridge is loaded (Y in S10), the control unit 140 determines whether the cartridge is of a type required in the fuel cell system 100 by referring to the data from the cartridge detector 142 (S12). If the cartridge is not of a type required (N in S12), the control unit 140 notifies the user of the type of cartridge required (S16). If the cartridge loaded is of a type required (Y in S12), the control unit 140 controls various devices in the fuel cell system 100 so as to execute processes adapted for the cartridge (S14). The process in S14 will be described in detail with reference to FIG. 5, etc.

Figure 4:
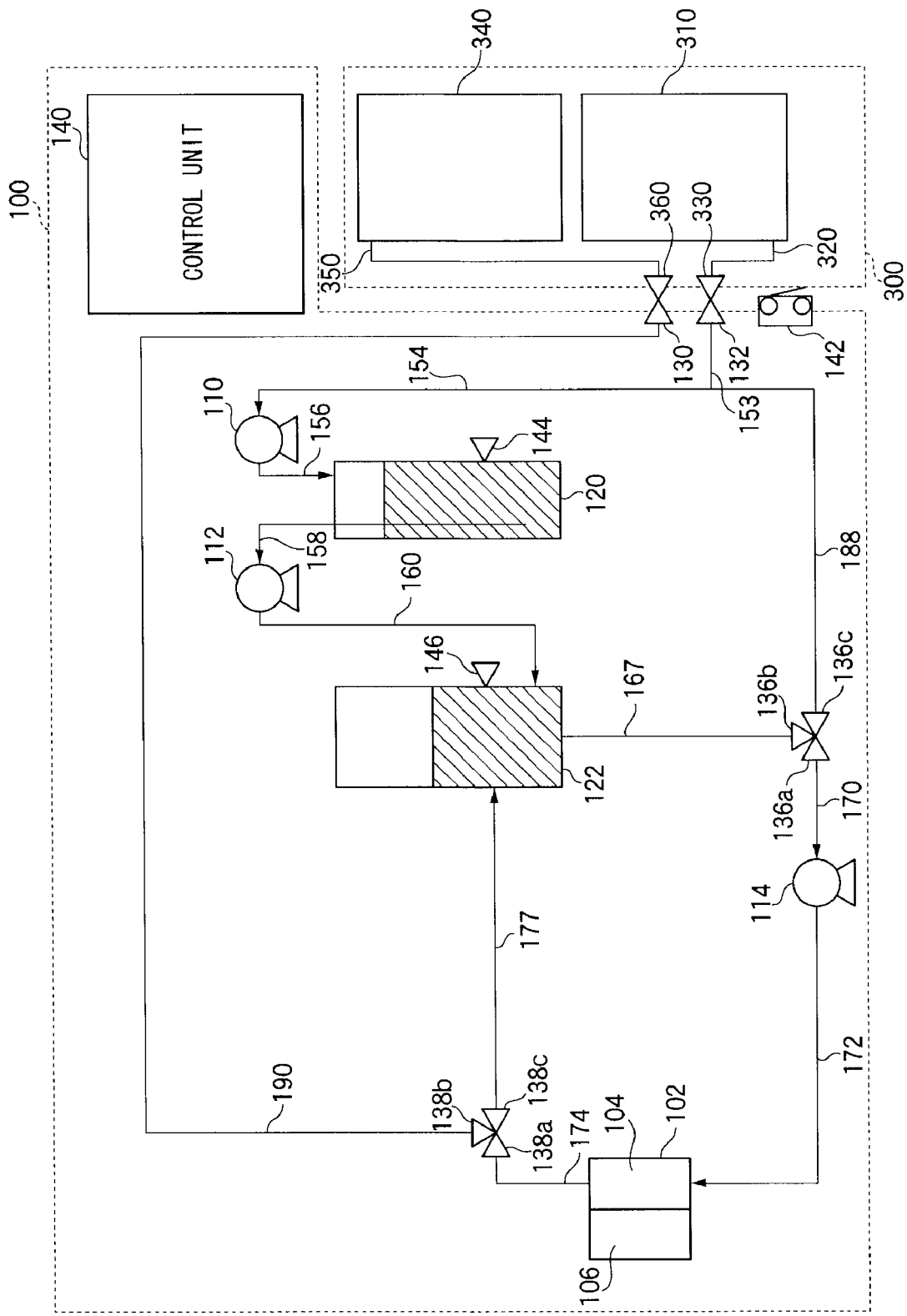
FIG. 4 is a schematic diagram of the fuel cell system equipped with an initial process cartridge.

FIG. 4 is a schematic diagram of the fuel cell system 100 equipped with an initial process cartridge 300. An initial process is required when the fuel cell system 100 has just been purchased or when the fuel cell 102 is to be inactivated and then re-used due to a long period of non-use. The initial process cartridge 300 includes a supply bag 310, a supply passage 320, a cartridge outlet joint 330, a collecting bag 340, a collecting passage 350 and a cartridge joint 360 for collection. The supply bag 310 is a variable-volume container and is connected to the cartridge outlet joint 330 via the supply passage 320. The cartridge outlet joint 330 is joined to the fuel cell system intake joint 132 so as to supply the content in the supply bag 310 to the fuel cell system 100. The supply bag 310 stores purified water or methanol at lower concentration than the high concentration methanol in the fuel cartridge 200. The purified water or the like stored in the supply bag 310 is supplied to the empty diluted fuel tank 122 and is used to subject the high concentration methanol in the fuel cartridge 200 loaded later to adjustment in order to obtain the concentration optimal for power generation.

The collecting bag 340 is a variable-volume container and is connected to the cartridge joint 360 for collection via the collecting passage 350. The cartridge joint 360 for collection is joined to the fuel cell system exhaust joint 130 so as to collect gas etc. discharged from the fuel cell system 100. As a result of the inactivation process, inert gas filling the fuel cell 102 is stored in the collecting bag 340.

Figure 5:
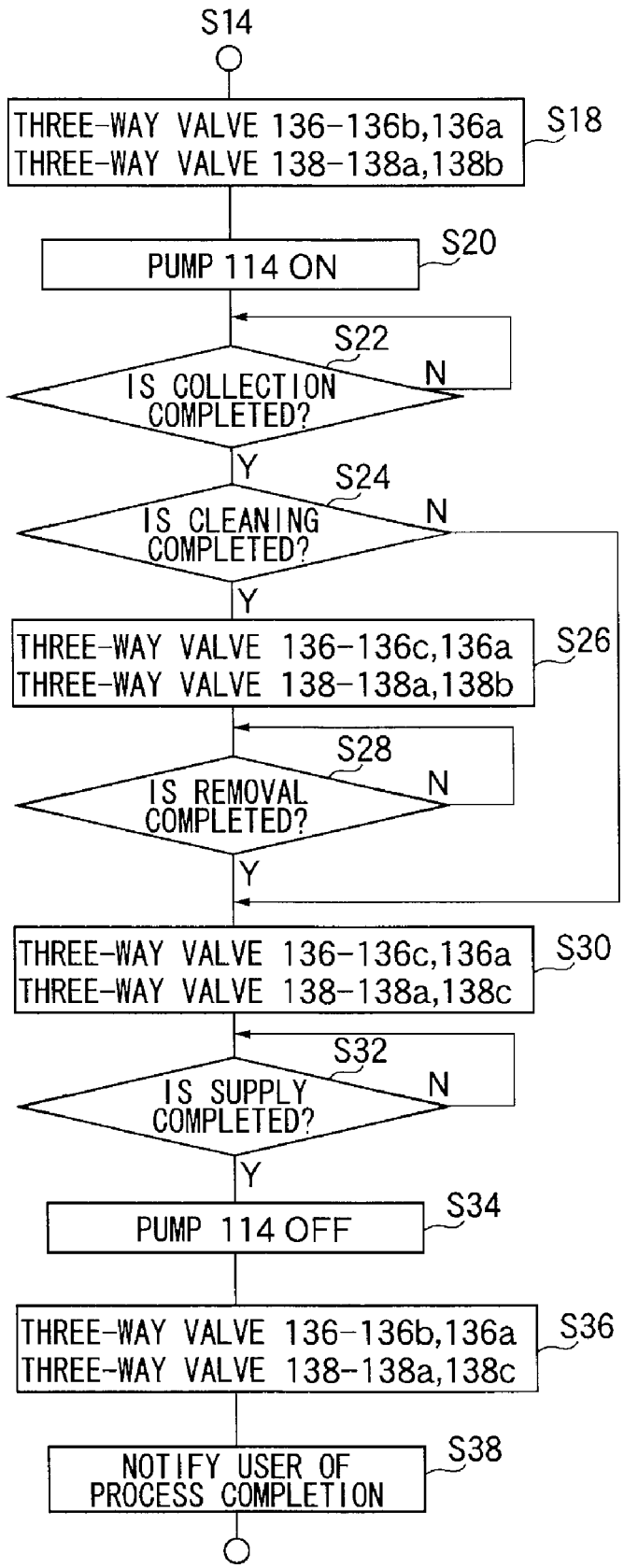
FIG. 5 is a flowchart showing a process performed when the initial process cartridge is loaded.

FIG. 5 is a flowchart showing a process performed when the initial process cartridge 300 is loaded. Initially, the control unit 140 obtains data indicating the valve positions of the three-way valve 136 and the three-way valve 138. Based on the valve positions thus obtained, the control unit 140 switches the valves so that an inlet 136b and an outlet 136a of the three-way valve 136 are connected, and an inlet 138a and an outlet 138b of the three-way valve 138 are connected (S18). When the valves have been switched, the operation of the pump 114 is started (S20). The fuel cell system 100 just purchased is filled with inert gas for prevention of oxidization of electrodes in the fuel cell 102. The fuel sub-tank 120 and the diluted fuel tank 122 are empty to prevent leakage of liquid. By switching the valves in the three-way valves and starting the pump 114, the inert gas in the diluted fuel tank 122 and the fuel cell 102 is distributed through the fuel supply passage 167, the fuel supply passage 170, the fuel supply passage 172, the anode side exhaust passage 174 and the exhaust passage 190 in the stated order. The inert gas thus distributed is stored in the collecting bag 340 via the collecting passage 350.

The collecting operation is continued until the collection is completed (N in S22). By measuring a time required for collection and maintaining the valve positions of the three-way valves for the measured time, the control unit 140 can determine whether the inert gas is completely collected. A sensor (not shown) may be provided in the exhaust passage 190 so as to determine whether the collection is completed by measuring the gas concentration. When the collection is completed (Y in S22), the type of process executed immediately prior to the initial process is detected by referring to the usage history recorded in the memory in the fuel cell system 100 (S24). A detailed description will be given with reference to FIG. 9 for a case where the detected process is a cleaning process (Y in S24). It will be assumed now that the fuel cell system 100 has just been purchased. No process is detected as being executed prior to the initial process. A determination is made that the detected process is not a cleaning process (N in 24).

The control unit 140 switches the valves so that an inlet 136c and the outlet 136a of the three-way valve 136 are connected, and the inlet 138a and the outlet 138b of the three-way valve 138 are connected (S30). By switching the valves in the three-way valves, the purified water etc. in the supply bag 310 is distributed through the supply passage 320, the fuel supply passage 153, the supply passage 188, the fuel supply passage 170, the fuel supply passage 172, the anode side exhaust passage 174 and the exhaust passage 177 in the stated order. The purified water etc. thus distributed is supplied to the diluted fuel tank 122 to dilute the high concentration methanol.

The operation of supplying purified water etc. is continued until the supply is completed (N in S32). By measuring the position of the liquid level in the diluted fuel tank 122 indicating sufficient amount of supply and by allowing the sensor 146 provided in the diluted fuel tank 122 to detect that position, the control unit 140 can determine that the supply is completed. When the supply is completed (Y in S32), the control unit 140 stops operating the pump 114 (S34).

The control unit 140 switches the valves so that the inlet 136b and the outlet 136a of the three-way valve 136 are connected, and the inlet 138a and an outlet 138c of the three-way valve 138 are connected (S18). By switching the valves in the three-way valves in this way, the passage that directly connects the fuel cell 102 to the cartridge is blocked. The control unit 140 notifies the user that the initialization process is completed (S38).

Figure 6:
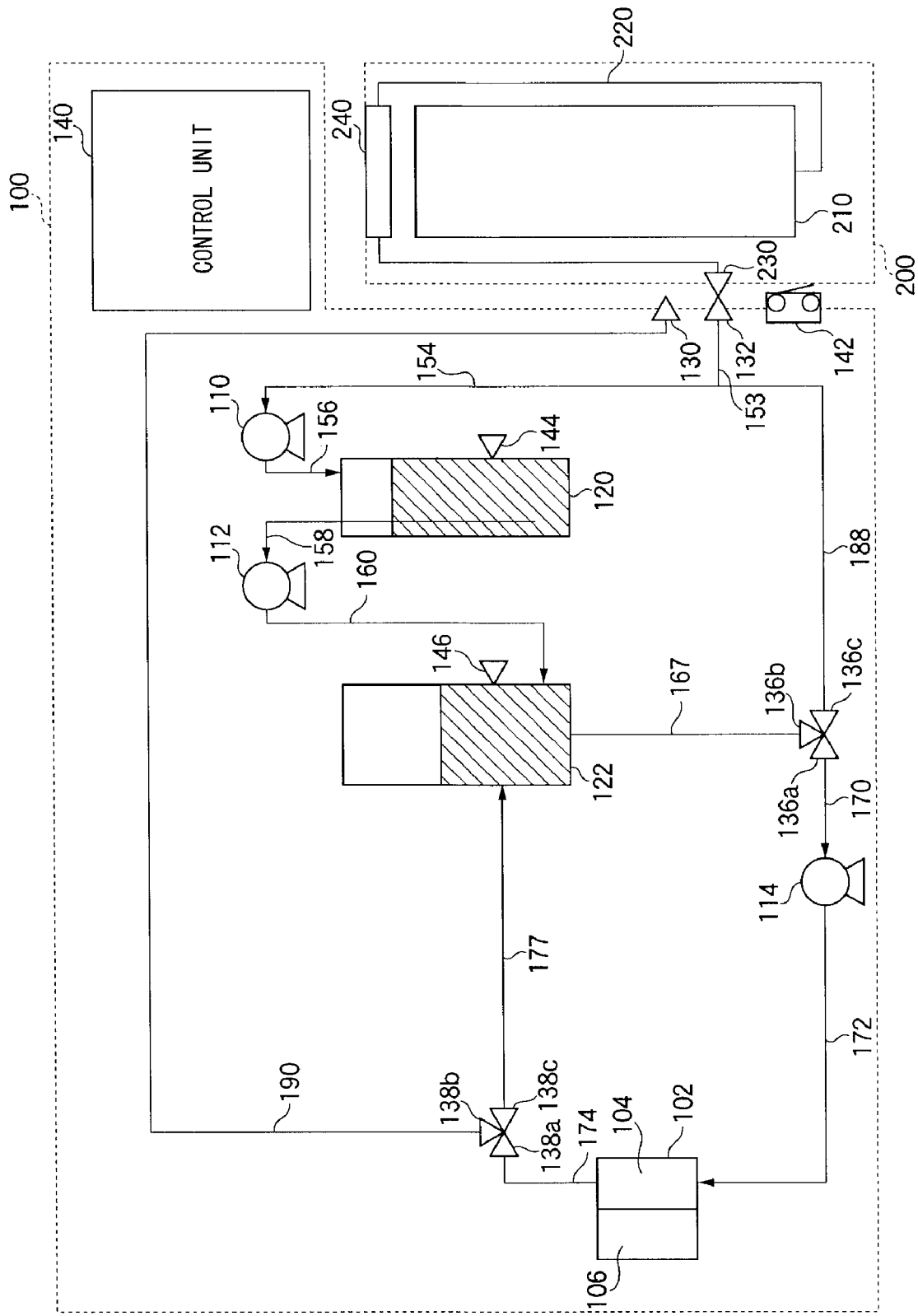
FIG. 6 is a schematic diagram of the fuel cell system equipped with a fuel cartridge.
Figure 7:
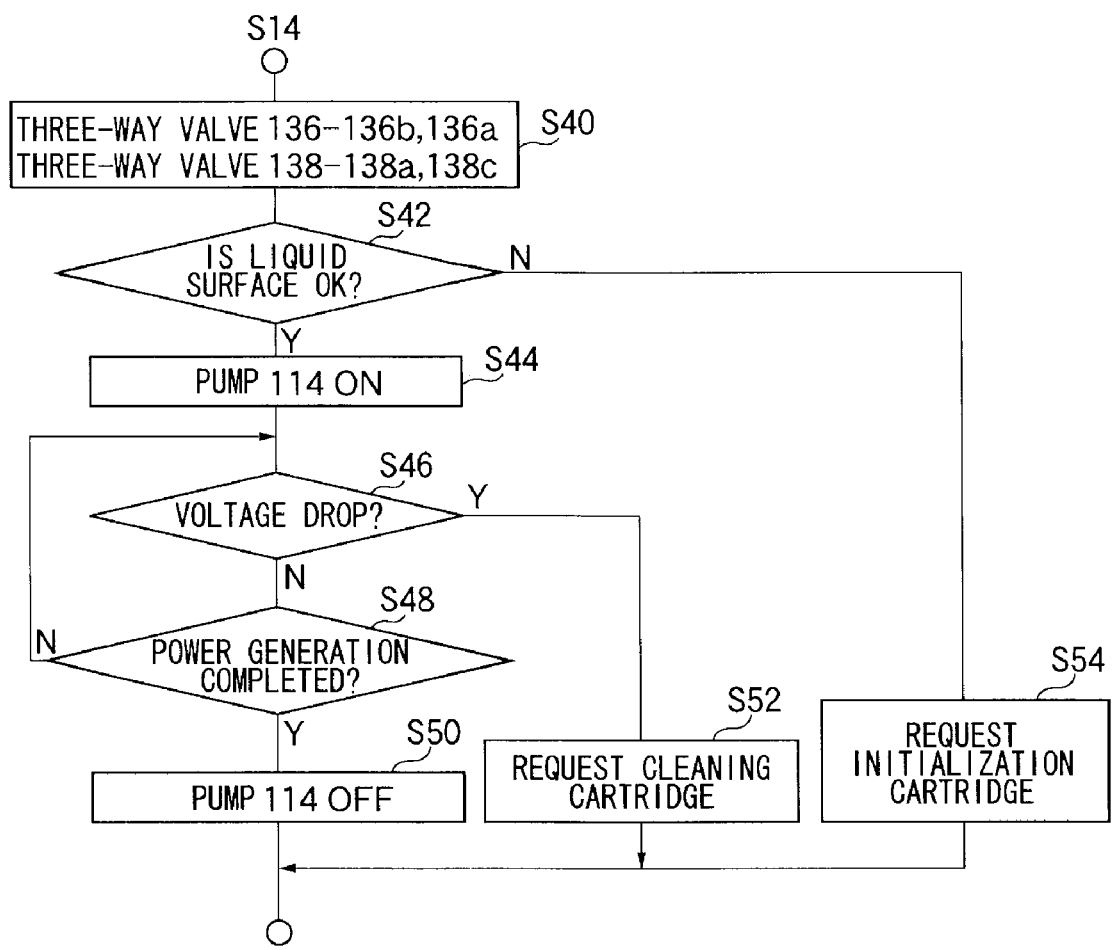
FIG. 7 is a flowchart showing a process performed when the fuel cartridge is loaded.

FIG. 6 is a schematic diagram of the fuel cell system 100 equipped with the fuel cartridge 200. FIG. 7 is a flowchart showing a process performed when the fuel cartridge 200 is loaded. Initially, the control unit 140 obtains data indicating the valve positions of the three-way valve 136 and the three-way valve 138. Based on the valve positions thus obtained, the control unit 140 switches the valves so that the inlet 136b and the outlet 136a of the three-way valve 136 are connected, and the inlet 138a and the outlet 138c of the three-way valve 138 are connected (S40). When the valves have been switched, the sensor 146 provided in the diluted fuel tank 122 detects the position of the liquid level of the methanol water solution in the tank (S42). When the liquid quantity is small and methanol water solution at a concentration optimal for power generation is not available even if the high concentration methanol is supplied from the fuel cartridge 200 (N in S42), the control unit 140 notifies the user that the initial process cartridge 300 is necessary (S54). The user replaces the cartridge 200 by the initial process cartridge 300. Once a sufficient amount of purified water etc. is supplied to the diluted fuel tank 122, the user changes to the fuel cartridge 200 again. When the liquid quantity in the diluted fuel tank 122 is sufficient (Y in S42), the sensor 146 detects the concentration. When the concentration of the water solution in the diluted fuel tank 122 is not optimal for power generation, the control unit 140 starts the operation of the pump 110 and the pump 112 so as to supply the high concentration methanol water solution in the fuel bag 210 to the diluted fuel tank 122. When the concentration of the water solution is optimal, the control unit 140 starts the operation of the pump 114 (S44).

The methanol water solution in the diluted fuel tank 122 is distributed by the pump 114 through the fuel supply passage 167, the fuel supply passage 170 and the fuel supply passage 172 before being supplied to the anode 104 side of the fuel cell 102. Meanwhile, air is supplied by the pump 116 (not shown) to the cathode 106 side of the fuel cell 102. In this way, the fuel cell 102 starts generating power.

The control unit 140 monitors the voltage generated while the fuel cell 102 is generating power. When a drop in the voltage due to degradation in the electrodes or electrolyte membrane (Y in S46), the control unit 140 notifies the user that the cartridge 200 should be replaced by a cleaning cartridge 400 (S52). A determination as to whether the cleaning process is necessary may be made by referring to total operating time of the fuel cell 102 recorded in the fuel cell system 100. The user changes to the cleaning cartridge 400 to clean the electrodes and the electrolyte membrane, before changing once again to the fuel cartridge 200. The process performed when the cleaning cartridge is loaded will be described in detail with reference to FIG. 8.

When a drop in the voltage is not detected (N in S46), power generation in the fuel cell 102 is continued. When the user finishes using equipment such as a notebook personal computer connected to the fuel cell system 100, the control unit 140 detects termination of the equipment (Y in S48) and then stops the operation of the pump 114 (S50). By stopping the pump 114, power generation is terminated. When the user continues to use the equipment and power generation is continued accordingly (N in S48), the control unit 140 continues to monitor the voltage generated by the fuel cell 102.

Figure 8:
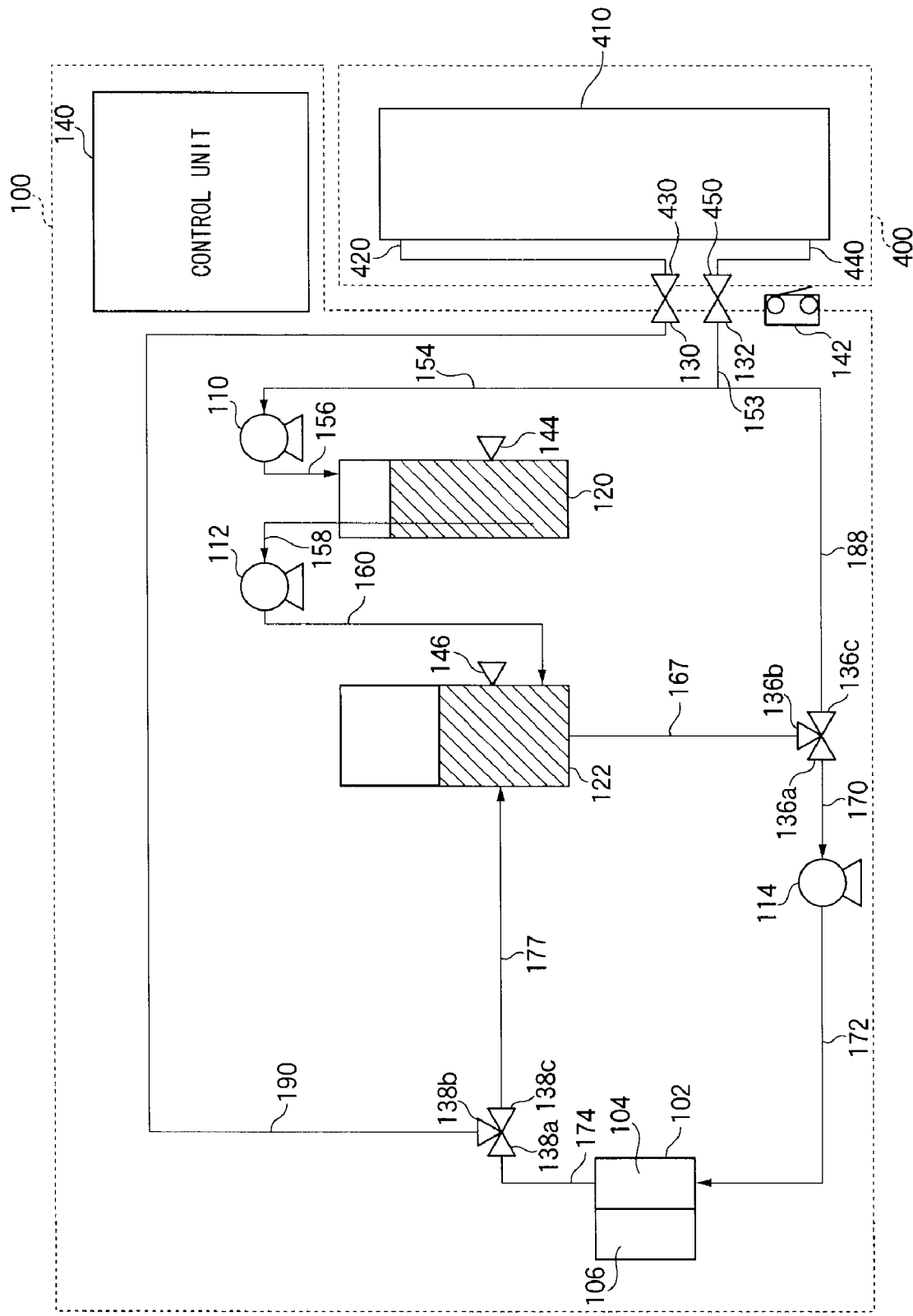
FIG. 8 is a schematic diagram of the fuel cell system equipped with a cleaning cartridge.

FIG. 8 is a schematic diagram of the fuel cell system 100 equipped with the cleaning cartridge 400. A cleaning process is necessary when the voltage generated by the fuel cell 102 drops or when the total operating time of the fuel cell 102 reaches a predetermined time. The cleaning cartridge 400 includes a cleaning liquid bag 410, a collecting passage 420, a cartridge joint 430 for collection, a supply passage 440 and a cartridge outlet joint 450. The supply bag 410 is a variable-volume container and is connected to the cartridge outlet joint 450 via the supply passage 440. The cartridge outlet joint 450 is joined to the fuel cell system intake joint 132 so as to supply the content of the cleaning liquid bag 410 to the fuel cell system 100. The cleaning liquid bag 410 stores dilute sulfuric acid at a concentration of about 0.5 mol/L as a cleaning liquid. The cleaning liquid is supplied to the fuel cell 102 so as to remove metal ions attached to the electrolyte membrane and oxides attached to the electrodes. This can recover the voltage generated by the fuel cell 102. Metal ions removed by the cleaning liquid include aluminum, calcium, copper and iron.

The cleaning liquid bag 410 is also connected to the cartridge joint 430 for collection via the collecting passage 420. The cartridge joint 430 for collection is joined to the fuel cell system exhaust joint 130 so as to collect the cleaning liquid discharged from the fuel cell 102. The collected cleaning liquid is stored in the cleaning liquid bag 410 again and is circulated through the cleaning cartridge 400 and the fuel cell system 100. Metal ions and oxides collected along with the cleaning liquid are filtered by a filter (not shown). An ion-exchange resin or a resin mesh material (polyethylene, polypropylene or Teflon (registered trademark) is used to form the filter. The filter should be provided in the communicating passage within the cleaning cartridge 400.

Figure 9:
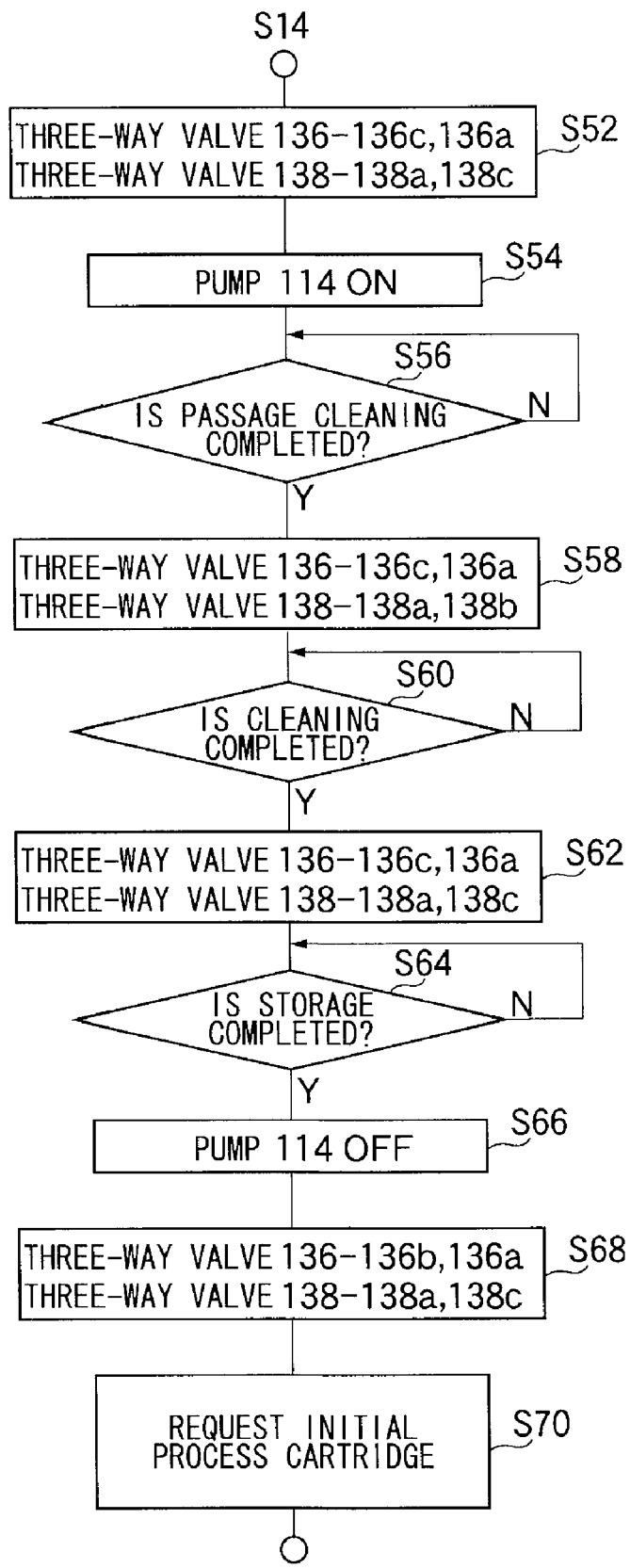
FIG. 9 is a flowchart showing a process performed when the cleaning cartridge is loaded.

FIG. 9 is a flowchart showing a process performed when the cleaning cartridge 400 is loaded. Initially, the control unit 140 obtains data indicating the valve positions of the three-way valve 136 and the three-way valve 138. Based on the valve positions thus obtained, the control unit 140 switches the valves so that the inlet 136c and the outlet 136a of the three-way valve 136 are connected, and the inlet 138a and the outlet 138c of the three-way valve 138 are connected (S52). When the valves have been switched, the operation of the pump 114 is started (S54). By switching the valves in the three-way valves in this way and starting the pump 114, the cleaning liquid in the cleaning bag 410 is distributed through the supply passage 440, the fuel supply passage 153, the supply passage 188, the fuel supply passage 170, the fuel supply passage 172, the anode side exhaust passage 174 and the exhaust passage 177 in the stated order. The cleaning liquid thus distributed is supplied to the diluted fuel tank 122. In this way, substance such as methanol water solution that remains in the distribution passages connecting the diluted fuel tank 122 to the fuel cell 102 after power generation is stored in the diluted fuel tank 122 along with the cleaning liquid.

The cleaning operation is continued until the cleaning of the passages is completed (N in S56). By measuring a time required for cleaning the passages and maintaining the valve positions of the three-way valves for the measured time, the control unit 140 can determine whether the cleaning of the passages is completed. After the cleaning process (Y in S56), the control unit 140 switches the valves so that the inlet 136b and the outlet 136a of the three-way valve 136 are connected, and the inlet 138a and the outlet 138b of the three-way valve 138 are connected (S58). By switching the valves in the three-way valves in this way, the cleaning liquid in the cleaning liquid bag 410 is distributed through the supply passage 440, the fuel supply passage 153, the supply passage 188, the fuel supply passage 170, the fuel supply passage 172, the anode side exhaust passage 174 and the exhaust passage 190 in the stated order. The cleaning liquid thus distributed is stored in the cleaning liquid bag 410 via the collecting passage 420. The cleaning liquid stored in the cleaning liquid bag 410 is supplied to the fuel cell system 100 again. By circulating the cleaning liquid, the electrodes and the membrane in the fuel cell 102 are cleaned.

The cleaning process is continued until the cleaning is completed (N in S60). By measuring a time required for cleaning and maintaining the valve positions of the three-way valves for the measured time, the control unit 140 can determine whether the cleaning is completed. After the cleaning (Y in S60), the control unit 140 switches the valves so that the inlet 136c and the outlet 136a of the three-way valve 136 are connected, and the inlet 138a and the outlet 138c of the three-way valve 138 are connected (S62). By switching the valves in the three-way valves in this way, the cleaning liquid in the cleaning liquid bag 410 is distributed through the supply passage 440, the fuel supply passage 153, the supply passage 188, the fuel supply passage 170, the fuel supply passage 172, the anode side exhaust passage 174 and the exhaust passage 177 in the stated order. The cleaning liquid thus distributed is stored to the diluted fuel tank 122.

The storage process is continued until the storage is completed (N in S64). By measuring a time required for storing the cleaning liquid of the cleaning liquid bag 410 and maintaining the valve positions of the three-valves for the measured time, the control unit 140 can determine whether the storage of cleaning liquid is completed. Alternatively, the sensor 146 provided in the diluted fuel tank 122 may detect that the diluted fuel tank 122 is sufficiently filled by referring to the liquid surface of the water solution in the tank and then determine that the storage of the cleaning liquid is completed.

When the storage is completed (Y in S64), the control unit 140 stops the operation of the pump 114 (S66). The control unit 140 switches the valves so that the inlet 136b and the outlet 136a of the three-way valve 136 are connected, and the inlet 138a and the outlet 138c of the three-way valve 138 are connected (S68). By switching the valves in the three-way valve in this way, the passage that directly connects the fuel cell 102 to the cartridge is blocked. The control unit 140 notifies the user that the initial process cartridge 300 should be substituted for the cartridge 400 in order to discharge a mixture of the cleaning liquid and the methanol water solution stored in the diluted fuel tank 122 outside the fuel cell system 100 (S70).

When the cartridge 400 is replaced by the initial process cartridge 300 as shown in FIG. 4, the fuel cell system 100 executes steps S18-S22 of FIG. 5. In this case, a mixture of the cleaning liquid and the methanol water solution, instead of the inert gas, stored in the diluted fuel tank 122 is stored in the collecting bag 340. The control unit 140 detects the type of process executed immediately prior to the initial process by referring to the usage history recorded in the memory in the fuel cell system 100 (S24). Since the detected process is a cleaning process (Y in S24), the control unit 140 switches the valves so that the inlet 136c and the outlet 136a of the three-way valve 136 are connected, and the inlet 138a and the outlet 138b of the three-way valve 138 are connected (S26). By switching the valves in the three-way valves in this way, the purified water etc. in the supply bag 310 is distributed through the supply passage 320, the fuel supply passage 153, the supply passage 188, the fuel supply passage 170, the fuel supply passage 172, the anode side exhaust passage 174 and the exhaust passage 190 in the stated order. This can remove the cleaning liquid that remains in the distribution passages after the cleaning process for circulating the cleaning liquid is completed. The purified water etc. containing the cleaning liquid is stored in the collecting bag 340 of the initial process cartridge 300 via the collecting passage 350.

The removal operation is continued until the removal of the cleaning liquid is completed (N in S28). By measuring a time required for completion of removal and maintaining the valve positions of the three-valves for the measured time, the control unit 140 can determine whether the cleaning liquid is completely removed. When the removal is completed (Y in S28), the steps S30-S38 mentioned above are executed. After the generated water is supplied to the diluted fuel tank 122, the pump 114 is stopped, and the initial process is terminated. Thereafter, the cartridge 300 is replaced by the fuel cartridge 200 again if the user wishes to generate power.

Two types of cleaning liquid may be used in the cleaning process in order to improve the capability of removing unwanted matter in the electrolyte membrane and the electrodes. The two types of cleaning liquid may be hydrogen peroxide water and dilute sulfuric acid mentioned above. The liquids are stored in the cleaning liquid bags 410 of different cleaning cartridges 400. First, the cleaning cartridge 400 storing the hydrogen peroxide water is loaded. Hydrogen peroxide water is circulated between the cartridge and the fuel cell 102 through the communicating passages so as to degrease the electrolyte membrane and the electrodes. Subsequently, the cleaning cartridge 400 storing dilute sulfuric performs the cleaning process mentioned above. By degreasing the electrolyte membrane and the electrodes before the cleaning process by dilute sulfuric acid, the capability of dilute sulfuric acid to remove unwanted matter in the membrane and the electrodes is improved so that power generation capability of the fuel cell 102 is improved accordingly.

Figure 10:
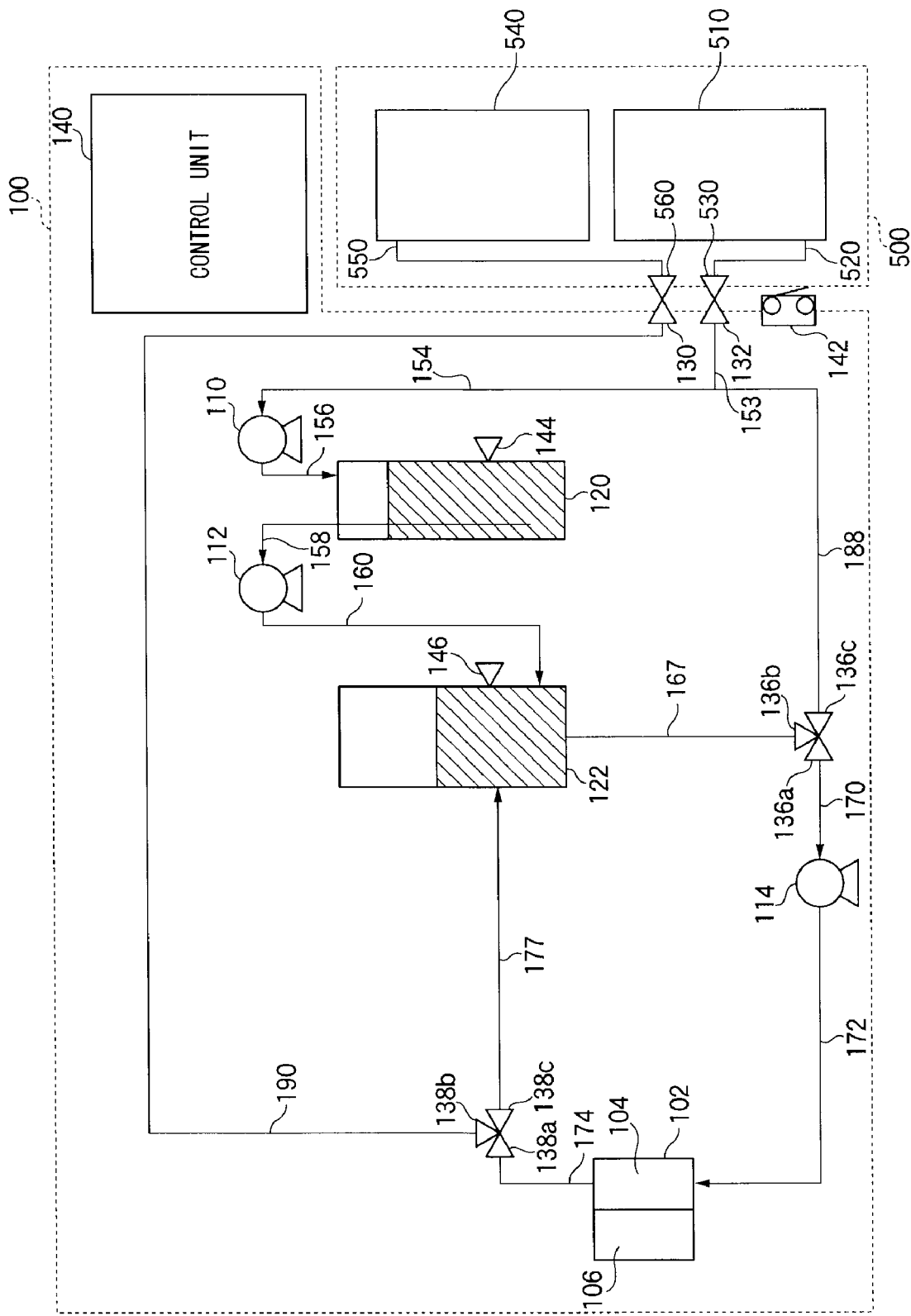
FIG. 10 is a schematic diagram showing the fuel cell system equipped with an inactivating process cartridge.

FIG. 10 is a schematic diagram showing the fuel cell system 100 equipped with an inactivating process cartridge 500. An inactivating process is necessary when the fuel cell 102 is kept unused for a long period of time or when the fuel cell 102 is discarded. The inactivating process cartridge 500 includes a supply bag 510, a supply passage 520, a cartridge outlet joint 530, a collecting bag 540, a collecting passage 550 and a cartridge joint 560 for collection. The supply bag 510 is a variable-volume container and is connected to the cartridge outlet joint 530 via the supply passage 520. The cartridge outlet joint 530 is joined to the fuel cell system intake joint 132 so as to supply the content in the supply bag 510 to the fuel cell system 100. The supply bag 510 stores argon or nitrogen, which are inert gas. The inert gas inside the supply bag 510 is supplied to the fuel cell 102 so as to prevent oxidization of the electrodes from occurring while the fuel cell 102 is kept unused for a long period of time. An alternative approach to inactivation is to hermetically seal, immediately after the inert gas is supplied to the fuel cell 102, the fuel cell system outlet joint 130, the fuel cell system intake joint 132 and the gas component exhaust passage 192 (not shown), using an adhesive that hardens when reacting with air. With this, the passage in the fuel cell 102 directly connected to the environment outside the fuel cell system 100 is tightly sealed, thereby reducing impact on the environment when the fuel cell 102 is discarded. The supply bag 510 may store powerful oxidant instead of inert gas. With this, the electrodes acting as catalysts are oxidized and inactivated. This makes it possible to discard the fuel cell 102 safely.

The recovery bag 540 is a variable-volume container and is connected to the cartridge recovery joint 560 via the recovery passage 550. The cartridge joint 560 for collection is joined to the fuel cell system exhaust joint 130 so as to collect the methanol water solution stored in the diluted fuel tank 122. This is to prevent leakage of liquid from occurring while the fuel cell 102 is kept unused for a long period of time.

Figure 11:
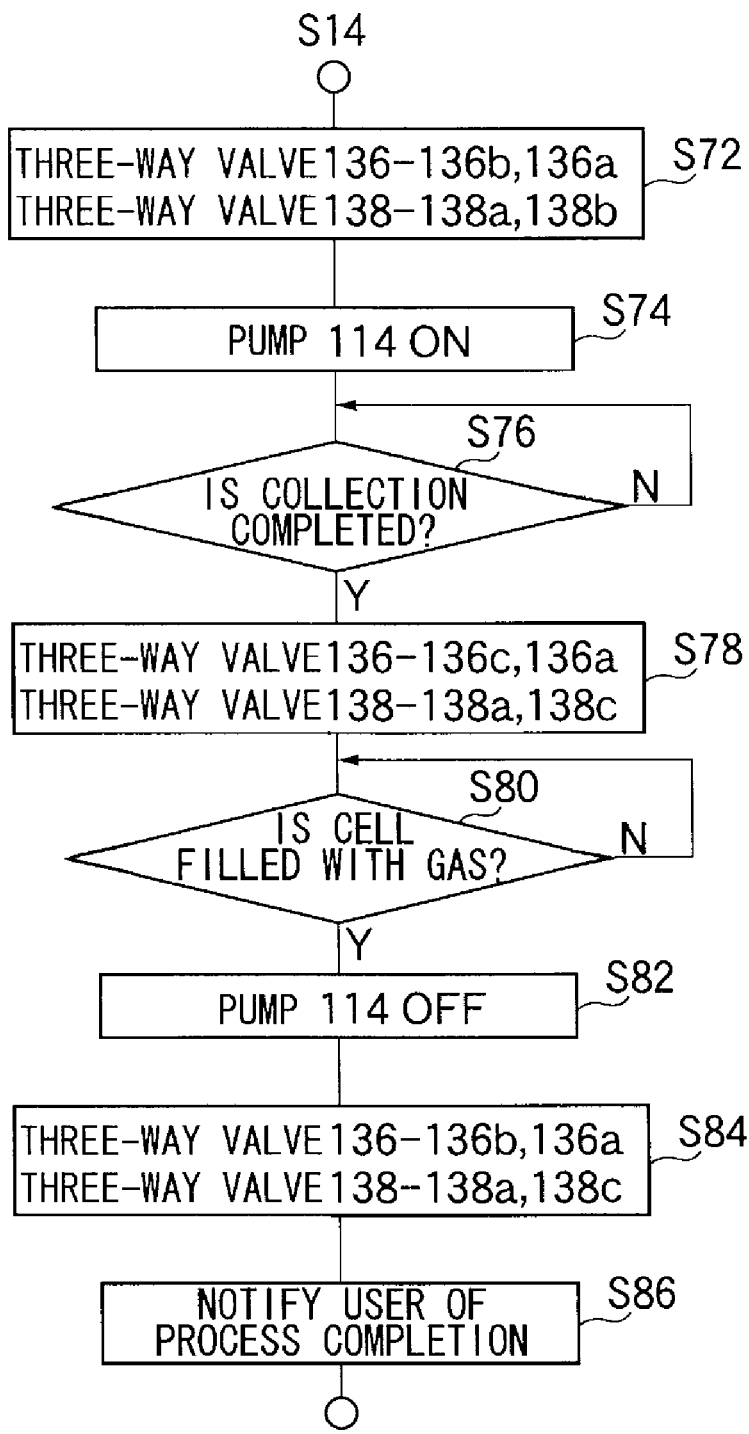
FIG. 11 is a flowchart showing a process performed when the inactivation process cartridge is loaded.

FIG. 11 is a flowchart showing a process performed when the inactivation process cartridge 500 is loaded. Initially, the control unit 140 obtains data indicating the valve positions of the three-way valve 136 and the three-way valve 138. Based on the valve positions thus obtained, the control unit 140 switches valves so that the inlet 136*b* and the outlet 136*a* of the three-way valve 136 are connected, and the inlet 138*a* and the outlet 138*b* of the three-way valve 138 are connected (S72). When the valves have been switched, the operation of the pump 114 is started (S74). By switching the valves in the three-way valves in this way and starting the pump 114, the methanol water solution in the diluted fuel tank 122 is distributed through the fuel supply passage 167, the fuel supply passage 170, the fuel supply passage 172, the anode side exhaust passage 174 and the exhaust passage 190 in the stated order. The methanol water solution thus distributed is collected in the collecting bag 540 via the collecting passage 550. When the methanol water solution remains in the fuel sub-tank 120, the control unit 140 starts the pump 112 before starting the pump 114 so as to transfer the methanol water solution in the fuel sub-tank 120 to the diluted fuel tank 122. By starting the pump 114 subsequently, the methanol water solution in the fuel sub-tank 120 is also collected.

The collecting process is continued until the collection is completed (N in S76). By measuring a time required for collection and maintaining the valve positions of the three-valves for the measured time, the control unit 140 can determine whether the collection is completed. The position of the liquid level may be measured by the sensor 146 provided in the diluted fuel tank 122 to determine whether the collection is completed. When the collection is completed (Y in S76), the control unit 140 switches the valves so that the inlet 136*c* and the outlet 136*a* of the three-way valve 136 are connected, and the inlet 138*a* and the outlet 138*c* of the three-way valve 138 are connected (S78). By switching the valves in the three-way valves in this way, the inert gas in the supply bag 510 is distributed through the supply passage 520, the fuel supply passage 153, the supply passage 188, the fuel supply passage 170 and the fuel supply passage 172 in the stated order. The inert gas thus distributed fills the fuel cell 102.

The gas continues to be supplied until the cell is filled with the inert gas (N in S80). By measuring a time required to fill the cell with the gas and maintaining the valve positions of the three-valves for the measured time, the control unit 140 can determine whether the filling operation is completed. When the filling operation is completed (Y in S80), the control unit 140 stops operating the pump 114 (S82). The control unit 140 switches the valves so that the inlet 136*b* and the outlet 136*a* of the three-way valve 136 are connected, and the inlet 138*a* and the outlet 138*c* of the three-way valve 138 are connected (S84). By switching the valves in the three-way valves in this way, the passage that directly connects the fuel cell 102 to the cartridge is blocked. The control unit 140 notifies the user that the inactivation process is completed (S86).

A process for aging the electrolyte membrane of the fuel cell 102 may be introduced in order to facilitate the chemical reaction in the fuel cell 102. For this purpose, a cartridge for the aging process is separately prepared. The aging process cartridge includes a heater and a purified water bag storing purified water. The purified water bag is connected to the cartridge outlet joint via a supply passage and is connected to the cartridge joint for collection via a collecting passage. The heater warms the purified water to a temperature optimal for aging the electrolyte membrane. The pump 114 and the three-way valves switched by the control unit 140 cause the heated purified water to be circulated through the cartridge and the fuel cell 102 through the communicating passages, so as to age the electrolyte membrane. Since ion exchange is facilitated in the aged electrolyte membrane, power generation capability of the fuel cell is improved.

Given above is an explanation of the present invention based upon the embodiment. Not only the embodiment but various variations will also be within the scope of the present invention. A description will be given of an embodiment in which the fuel cell system 100 includes one three-way valve.

Figure 12:
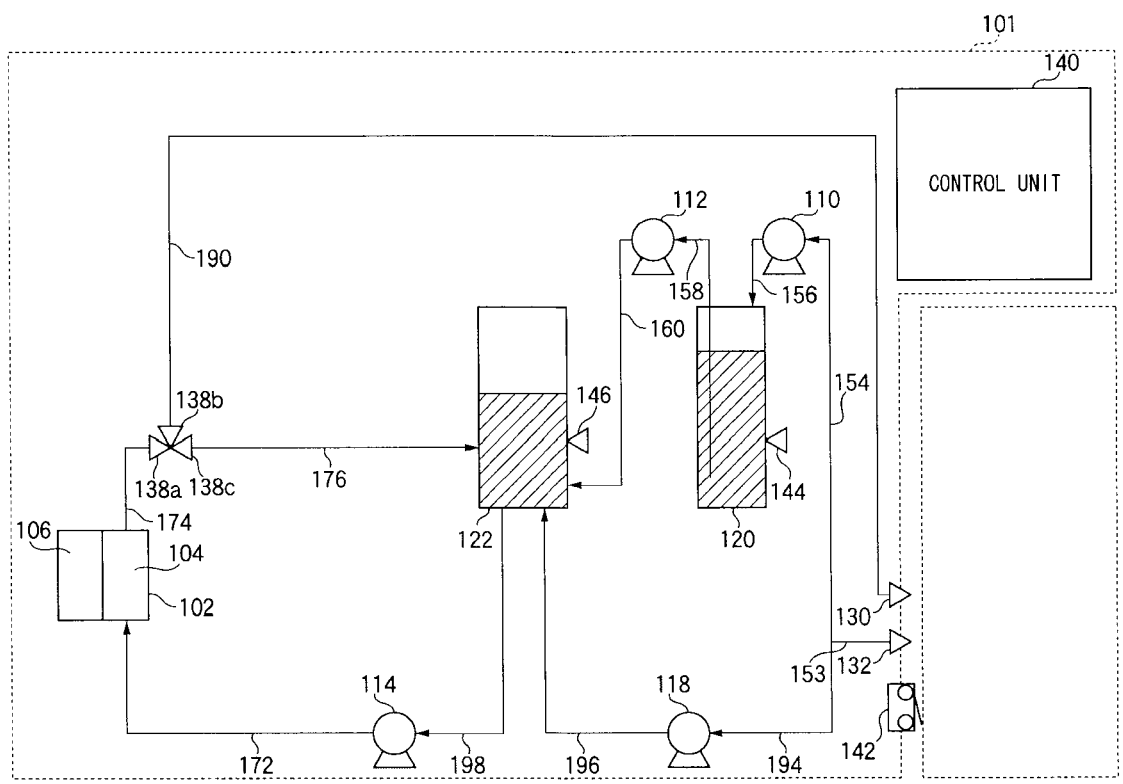
FIG. 12 is block diagram of a fuel cell system according to a variation of the embodiment.

FIG. 12 is block diagram of a fuel cell system 101 according to a variation of the embodiment. The fuel passage 153 branches into the fuel supply passage 154 and the supply passage 194. The supply passage 194 is directly connected to the diluted fuel tank 122 via the supply passage 196. No three-way valve is provided in the supply passage 196 for causing the passage 196 to branch into a passage leading to the diluted fuel tank 122 and a passage leading to the fuel cell 102. Thus, the pump 118 is necessary to supply the effluent from the cartridge to the diluted fuel tank 122. Since a three-way valve is not provided, the passage for supplying the methanol water solution from the diluted fuel tank 122 to the fuel cell 102 is independent of the passage for supplying the effluent from the cartridge to the diluted fuel tank 122. The methanol water solution of the diluted fuel tank 122 is distributed through the fuel supply passage 198 and the fuel supply passage 172 before being supplied to the anode 104 side of the fuel cell 102. A description of those structural aspects of the fuel cell system 101 that are common to the embodiment is omitted.

A description will be given of a case where the initial process cartridge 300 is loaded in the fuel cell system 101. The control unit 140 switches the valves so that the inlet 138a and the outlet 138b of the three-way valve 138 are connected, and starts the pump 114. The inert gas in the diluted fuel tank 122 is distributed through the fuel supply passage 198, the fuel supply passage 172, the anode side exhaust passage 174 and the exhaust passage 190 before being stored in the collecting bag 340 of the initial process cartridge 300. By stopping the pump 114 and starting the pump 118, the purified water etc. in the supply bag 310 of the initial process cartridge 300 is distributed through the fuel supply passage 153, the supply passage 194 and the supply passage 196. The purified water etc. thus distributed is supplied to the diluted fuel tank 122, thereby completing the initial process.

A description will be given of a case where the fuel cartridge 200 is loaded in the fuel cell system 101. The control unit 140 switches valves so that the inlet 138a and the outlet 138c of the three-way valve 138, and starts the pump 114. The methanol water solution in the diluted fuel tank 122 is distributed through the fuel supply passage 198 and the fuel supply passage 172 before being supplied to the anode 104 side of the fuel cell 102. Air is supplied to the cathode 106 side of the fuel cell 102 by the pump 116 (not shown). This starts power generation in the fuel cell 102.

A description will be given of a case where the cleaning cartridge 400 is loaded in the fuel cell system 101. The control unit 140 switches the valves so that the inlet 138a and the outlet 138b of the three-way valve 138 are connected, and starts the pumps 114 and 118. The methanol water solution in the diluted fuel tank 122 is distributed through the fuel supply passage 198, the fuel supply passage 172, the anode side exhaust passage 174 and the exhaust passage 190 before being stored in the cleaning liquid bag 410. By circulating the cleaning liquid through the cleaning liquid bag 410, the diluted fuel tank 122 and the fuel cell 102, the passages and the electrodes/electrolyte membrane in the fuel cell 102 are cleaned. The control unit 140 stops the pumps 114 and 118, switches the valves so that the inlet 138a and the outlet 138c of the three-way valve 138 are connected, and notifies the user that the initial process cartridge 300 is requested. Once the initial process cartridge 300 is loaded, the control unit 140 switches the valves so that the inlet 138a and the outlet 138b of the three-way valve 138 are connected, and starts the pump 114. The methanol water solution in the diluted fuel tank 122 is distributed through the fuel supply passage 198, the fuel supply passage 172, the anode side exhaust passage 174 and the exhaust passage 190 before being supplied to the collecting bag 340 of the initial process cartridge 300.

When the storage is completed, the control unit 140 stops the pump 114 and notifies the user that the cleaning cartridge 400 is requested. Once the cleaning cartridge 400 is loaded, the control unit switches the valves so that the inlet 138a and the outlet 138b of the three-way valve 138 are connected, and starts the pumps 114 and 118. This causes the cleaning liquid of the cleaning liquid bag 410 to be distributed through the fuel supply passage 153, the supply passage 194, the supply passage 196, the fuel supply passage 198, the fuel supply passage 172, the anode side exhaust passage 174 and the exhaust passage 190 before being stored in the cleaning liquid bag 410 again.

When the circulation cleaning is completed, the control unit 140 stops the pumps 114 and 118, and notifies the user that the initial process cartridge 300 is requested. Once the initial process cartridge 300 is loaded, the control unit switches the valves so that the inlet 138a and the outlet 138b of the three-way valve 138 are connected, and starts the pumps 114 and 118. This causes the purified water etc. in the supply bag to be distributed through the fuel supply passage 153, the supply passage 194, the supply passage 196, the fuel supply passage 198, the fuel supply passage 172, the anode side exhaust passage 174 and the exhaust passage 190. The purified water etc. thus distributed is stored in the collecting bag 340 along with the cleaning liquid that remains in the communicating passage, thereby completing the cleaning process.

A description will be given of a case where the inactivating cartridge 500 is loaded in the fuel cell system 101. The control unit 140 switches the valves so that the inlet 138a and the outlet 138b of the three-way valve 138 are connected, and starts the pump 114. The methanol water solution in the diluted fuel tank 122 is distributed through the fuel supply passage 198, the fuel supply passage 172, the anode side exhaust passage 174 and the exhaust passage 190 before being stored in the collecting bag 540 of the inactivating process cartridge 500. When the storage is completed, the control unit 140 switches the valves so that the inlet 138a and the outlet 138c of the three-way valve 138 are connected, and starts the pump 118. The inert gas in the supply bag 510 of the inactivation process cartridge 500 is distributed through the fuel supply passage 153, the supply passage 194 and the supply passage 196 before being supplied to the diluted fuel tank 122. The inert gas thus supplied is distributed through the fuel supply passage 198, the fuel supply passage 172, the anode side exhaust passage 174 and the exhaust passage 176 so as to be circulated between the diluted fuel tank 122 and the fuel cell 102. This results in the inert gas filling the fuel cell 102 and completes the inactivation process.

What is claimed is:

1. A fuel cell system comprising:
    a fuel cell which generates power using liquid fuel and oxidant;
    a fuel tank which stores the liquid fuel;
    a cartridge holder in which a plurality of types of cartridges are replaceably loaded;
    cartridge detecting means which detects the type of cartridge loaded in the cartridge holder;
    a first passage which supplies the content of the fuel tank to the fuel cell;
    a second passage which supplies the content of the cartridge to the fuel cell;
    a third passage which supplies the content of the cartridge to the fuel tank;
    a fourth passage which passes the effluent from the fuel cell to the fuel tank;
    a fifth passage which passes the effluent from the fuel cell to the cartridge;
    first passage control means which switches to one of the first passage and the second passage for supply to the fuel cell in accordance with the type of cartridge detected; and second passage control means which switches to one of the fourth passage and the fifth passage for discharge from the fuel cell in accordance with the type of cartridge detected, wherein when the cartridge detecting means detects that the loaded cartridge contains a fuel, the first passage control means switches to the first passage for supply to the fuel cell, the second passage control means switches to the fourth passage for discharge from the fuel cell, and the content from the cartridge is supplied to the fuel cell via the fuel tank.

2. A fuel cell system comprising:

a fuel cell which generates power using liquid fuel and oxidant;

a fuel tank which stores the liquid fuel;

a cartridge holder in which a plurality of types of cartridges are replaceably loaded;

cartridge detecting means which detects the type of cartridge loaded in the cartridge holder;

a first passage which supplies the content of the fuel tank to the fuel cell;

a second passage which supplies the content of the cartridge to the fuel cell;

a third passage which supplies the content of the cartridge to the fuel tank;

a fourth passage which passes the effluent from the fuel cell to the fuel tank;

a fifth passage which passes the effluent from the fuel cell to the cartridge;

first passage control means which switches to one of the first passage and the second passage for supply to the fuel cell in accordance with the type of cartridge detected, and second passage control means which switches to one of the fourth passage and the fifth passage for discharge from the fuel cell in accordance with the type of cartridge detected, wherein when the cartridge detecting means detects that the loaded cartridge contains a cleaning liquid, the first passage control means switches to the second passage for supply to the fuel cell, the second passage control means switches to the fifth passage for discharge from the fuel cell, and the cleaning liquid discharged from the cartridge is supplied to the fuel cell, and the effluent from the fuel cell collected in the cartridge.

3. A fuel cell system comprising:

a fuel cell which generates power using liquid fuel and oxidant;

a fuel tank which stores the liquid fuel;

a cartridge holder in which a plurality of types of cartridges are replaceably loaded;

cartridge detecting means which detects the type of cartridge loaded in the cartridge holder;

a first passage which supplies the content of the fuel tank to the fuel cell;

a second passage which supplies the content of the cartridge to the fuel cell;

a third passage which supplies the content of the cartridge to the fuel tank;

a fourth passage which passes the effluent from the fuel cell to the fuel tank;

a fifth passage which passes the effluent from the fuel cell to the cartridge;

first passage control means which switches to one of the first passage and the second passage for supply to the fuel cell in accordance with the type of cartridge detected, and second passage control means which switches to one of the fourth passage and the fifth passage for discharge from the fuel cell in accordance with the type of cartridge detected, wherein when the cartridge detecting means detects that the loaded cartridge includes two containers, the first container including purified water or liquid fuel diluted to a certain concentration for supply to the fuel tank, and that the cartridge is adapted to collect the effluent discharged from the fuel cell to the second container, the first passage control means switches to the first passage for supply to the fuel cell, the second passage control means switches to the fifth passage for discharge from the fuel cell, the effluent from the fuel cell and the content in the fuel tank are collected in the second container, the first passage control means switches to the second passage for supply to the fuel cell, the second passage control means switches to the fourth passage for discharge from the fuel cell, and the purified water or liquid fuel diluted to a certain concentration contained in the first container is supplied to the fuel tank.

4. A fuel cell system comprising:

a fuel cell which generates power using liquid fuel and oxidant;

a fuel tank which stores the liquid fuel;

a cartridge holder in which a plurality of types of cartridges are replaceably loaded;

cartridge detecting means which detects the type of cartridge loaded in the cartridge holder;

a first passage which supplies the content of the fuel tank to the fuel cell;

a second passage which supplies the content of the cartridge to the fuel cell;

a third passage which supplies the content of the cartridge to the fuel tank;

a fourth passage which passes the effluent from the fuel cell to the fuel tank;

a fifth passage which passes the effluent from the fuel cell to the cartridge;

first passage control means which switches to one of the first passage and the second passage for supply to the fuel cell in accordance with the type of cartridge detected, and second passage control means which switches to one of the fourth passage and the fifth passage for discharge from the fuel cell in accordance with the type of cartridge detected, wherein when the cartridge detecting means detects that the loaded cartridge includes two containers, the first container storing an inert gas for prevention of degradation to the fuel cell, and that the cartridge is adapted to collect the effluent discharged from the fuel cell to the second container, the first passage control means switches to the first passage for supply to the fuel cell, the second passage control means switches to the fifth passage for discharge from the fuel cell, the effluent from the fuel cell and the content in the fuel tank are collected in the second container, the first passage control means switches to the second passage for supply to the fuel cell, the second passage control means switches to the fourth passage for discharge from the fuel cell, and the inert gas contained in the first container is supplied to the fuel cell.

* * * * *